United States Patent Office 2,784,948
Patented Mar. 12, 1957

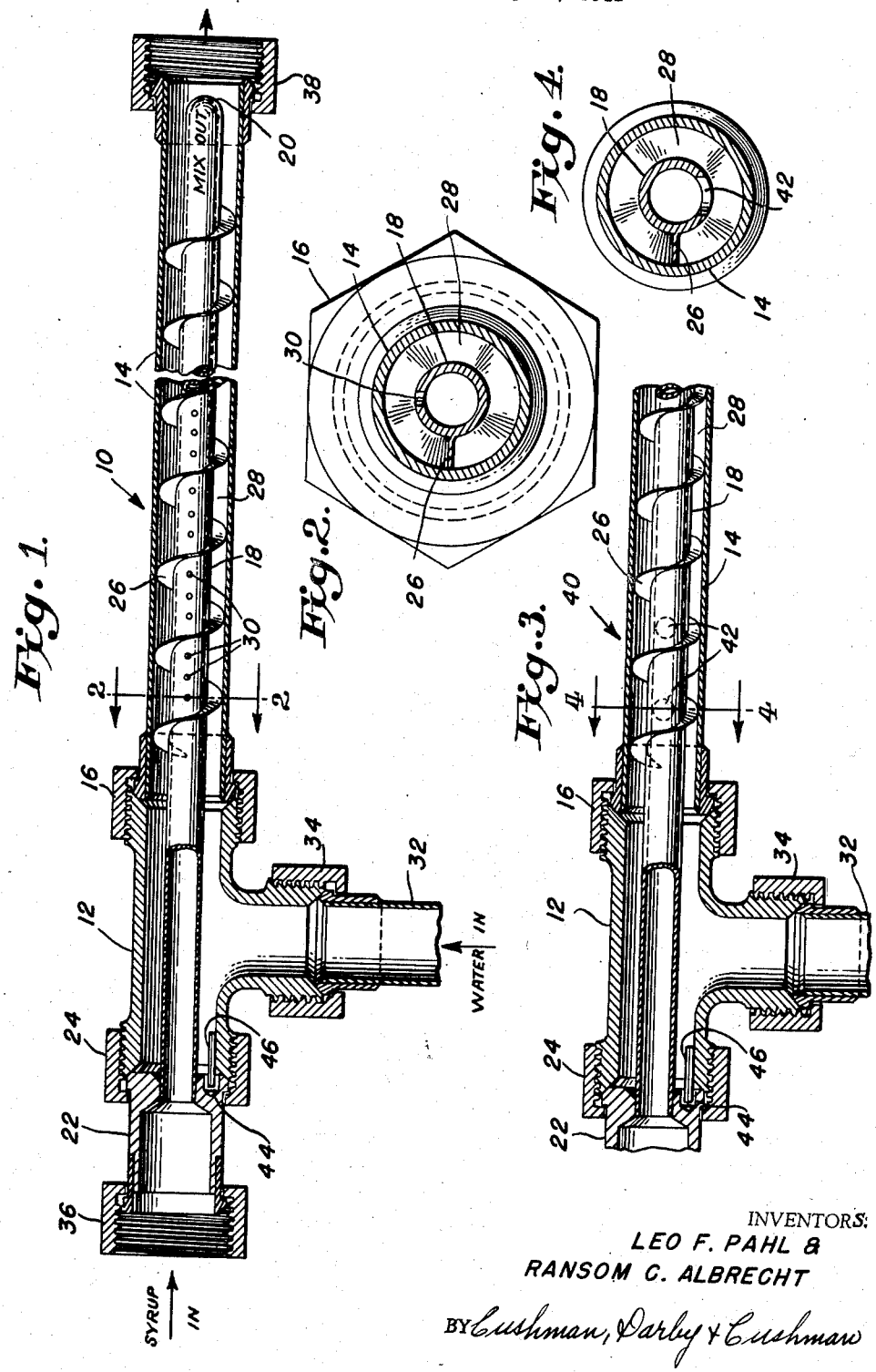

2,784,948

LIQUID MIXING DEVICE

Leo F. Pahl and Ransom C. Albrecht, Baltimore, Md., assignors to Crown Cork & Seal Company, Inc., Baltimore, Md., a corporation of New York Original application May 18, 1951, Serial No. 227,056. Divided and this application November 14, 1952, Serial No. 320,502

2 Claims. (Cl. 259—4)

This invention relates to a liquid mixing device, and more particularly to a device for blending two flowing liquids. This application is a division of our co-pending application Serial No. 227,056, filed May 18, 1951, now Patent No. 2,724,581 granted November 22, 1955.

In the aforementioned co-pending application, there is disclosed a liquid proportioning and mixing system wherein two pumps are operated to receive liquid from separate sources of supply and to deliver the two liquids in constant, but adjustable, flow rates to a mixing device. Such apparatus is particularly intended for use in proportioning water and flavoring syrup for the preparation of a carbonated beverage. In the preparation of soft drinks it is highly desirable that the proportions of the two ingredients, i. e. water and syrup, be maintained constant at all times, and to this end, even when the aforementioned pumps are stopped, the apparatus must be so designed that there is no disproportionate mixture of the two liquids at any point along the flow lines. Further, all parts of the apparatus should be constructed for easy disassembly and cleaning for obvious sanitary purposes.

Mixing devices for use in the blending of soft-drink ingredients heretofore have been constructed so that, upon cessation of flow of the two ingredient liquids, undesirable draining of one liquid into the other could occur. Hence, when flow was resumed, there was discharged from the apparatus a quantity of the mixture which not only was not intimately blended but also not in proper proportions.

Further, soft-drink-proportioning and mixing apparatus sometimes is used for the preparation of pulpy beverages, such as the various types of fruit drinks. In this type of apparatus, clogging of the mixing device frequently occurs.

Accordingly, it is an object of this invention to provide a mixing device for the intimate blending of two flowing liquids.

It is another object of this invention to provide a blending device of the type disclosed which can be easily and quickly disassembled and cleaned.

It is another object of this invention to provide a mixing device of the type disclosed which will prevent undesirable draining, by gravity, of one liquid into the other upon cessation of their flow.

It is a further object of this invention to provide a mixing device of the type disclosed which minimizes any tendency for clogging when used with a pulpy liquid.

Other objects and advantages of this invention will be evident from the following description and accompanying drawings in which:

Figure 1 is a horizontal sectional view of a mixing device embodying this invention.

Figure 2 is an enlarged vertical sectional view taken on line 2—2 of Figure 1.

Figure 3 is a fragmentary horizontal sectional view of a modified form of mixing device embodying this invention.

Figure 4 is an enlarged vertical sectional view taken on line 4—4 of Figure 3.

Although the invention will be described with reference to the mixing of water and syrup for the preparation of a beverage, it will be realized that the invention can be used for the blending of any two flowing liquids.

Referring now to the drawings, there is shown in Figure 1 a mixing device or blender 10 comprising a T fitting 12 having a horizontally disposed tubular casing 14 coupled, by a coupling nut 16, to one end thereof. Projecting through the T 12 and into the tubular casing 14 is a coaxially disposed tube 18 of reduced diameter and having a closed forward end 20, thus forming an annular space between the interior surface of the casing 14 and the exterior surface of the tube 18. The tube 18 has an enlarged rearward portion 22 that is coupled in sealing relation, by a coupling nut 24, to the other end of the T 12. A spiral vane 26 is mounted in the annular space between the casing 14 and the tube 18 and is in contact with the interior surface of the casing and exterior surface of the tube to form therewith a helical passageway 28. In the embodiment shown in Figures 1 and 2 a longitudinal row of relatively small discharge ports 30 are provided in the upper side of the tube 18 for discharging the contents of the tube into the helical passageway 28. Only a limited number of such ports 30 are provided, twelve as illustrated in Figure 1, three for each of the first four convolutions of the helical passageway 28. It is to be noted that the number of passageway convolutions is preferably double that number (4), so that the passageway 28 continues for a considerable extent past the last three ports 30 in the row. The delivery line 32 for water is coupled to the lateral port of the T 12, by a coupling nut 34, and the delivery line (not shown) for syrup is coupled to the rearward portion 22 of the tube 18, by a coupling nut 36.

Hence, when the apparatus is in operation, water flows into the helical passageway 28 while syrup flows into the tube 18 and thence through the discharge ports 30 to mix with the water in concurrent flow in the first part of the passageway. From the proportion of the parts shown in Figure 1, it will thus be seen that a thin but wide current of water spirals around the centrally-located syrup tube 18 at rather high velocity. This turbulent and ever-changing direction of flow of the water serves to thoroughly mix and blend the syrup emerging from the ports 30 with the water. It also will be noted that the two liquids continue to spiral and mix after the syrup has been projected into the water, to thus make for a more complete blend before the mixture emerges from the blender unit 10 into a mixture delivery line (not shown) which may be coupled thereto by a coupling nut 38. The simplicity of construction of the blender which provides a unit that can be easily disassembled and cleaned in a short time is also a desirable sanitary feature for beverage apparatus.

By disposing the blender 10 in a horizontal position with no portions of the syrup delivery line higher than the blender and positioning the longitudinal row of discharge ports 30 on the upper side of the syrup tube 18, the flow of the two fluids may be stopped without an undesirable draining, by gravity, of the residual syrup in the tube 18 and in the syrup delivery line into the water remaining in the helical passageway 28.

In the event that the apparatus is to be used for preparing pulpy beverages, such as various types of fruit drinks, the modified blender 40 shown in Figures 3 and 4 is desirable. In this modification, the number of syrup discharge ports 42 is considerably limited, only two being shown in the drawing, one for each of the first two convolutions of the passageway 28. These ports 42, however, are of considerably larger cross-sectional area than those illustrated in Figure 1, having in fact, a diameter preferably over half that of the syrup tube 18, and are located on the underside of the tube. The location and larger size of these ports 42 inhibit any tendency of the mixer 40 to become clogged by pulpy syrup during operation of the apparatus.

In both embodiments of the invention the enlarged rearward portion 22 of the tube 18 is provided with a socket 44 for reception of a pin 46 projecting from the T 12 in order to assure correct orientation of the tube ports, 30 or 42, when the tube is coupled to the T.

It thus will be seen that the objects of this invention have been fully and effectively accomplished. It will be realized, however, that various changes may be made in the specific embodiments shown and described for the purpose of illustrating the principles of this invention without departing from such principles. Therefore, this invention includes all modifications which are encompassed by the spirit and scope of the following claims.

We claim:

1. A device for intimately mixing or blending two different flowing liquids comprising: a tubular casing having an inlet and an outlet; a tube of lesser diameter mounted coaxially within said casing and in spaced relation therewith, one end of said tube being closed and disposed adjacent said casing outlet and the other end of said tube having an inlet means for introducing one liquid into said casing inlet and the other liquid into said tube inlet; and a fixed spiral vane spanning the space between said tube and said casing to define a helical passageway having a plurality of convolutions, said tube being provided with outlet ports which open to said passageway along substantially no more than the first half of the length of said passageway, whereby the mixture of the liquids, after the formation of the mixture at the outlet ends of said ports, continues to spiral in said passageway beyond said ports toward the end of said passageway to effect a more intimate blend of the mixture.

2. The structure defined in claim 1 wherein the casing is adapted to be disposed horizontally and the tube ports are disposed only in the upper side of the tube, whereby on cessation of flow of the two liquids, the liquid in the tube will not drain by gravity therefrom into the passageway and cause an incorrect proportioning of the mixture.

References Cited in the file of this patent
UNITED STATES PATENTS

| | | |
|---|---|---|
| 659,278 | Argerbright | Oct. 9, 1900 |
| 923,571 | Paterson | June 1, 1909 |
| 1,496,345 | Lichtenthaeler | June 3, 1924 |
| 1,678,225 | Kincade | July 24, 1928 |
| 1,769,275 | Rice | July 1, 1930 |
| 1,953,091 | Westberg et al. | Apr. 3, 1934 |
| 2,394,561 | Parkhurst | Feb. 12, 1946 |
| 2,605,084 | Reents et al. | July 29, 1952 |

FOREIGN PATENTS

| | | |
|---|---|---|
| 109,986 | Sweden | Feb. 24, 1940 |